United States Patent
Johnson

Patent Number: 6,152,241
Date of Patent: Nov. 28, 2000

[54] DUAL BLADE HOE

[76] Inventor: James H. Johnson, R.R. 2, Box 23, Clarkfield, Minn. 56233

[21] Appl. No.: 09/370,445

[22] Filed: Aug. 9, 1999

Related U.S. Application Data

[60] Provisional application No. 60/096,201, Aug. 12, 1998.

[51] Int. Cl.[7] .................................................. A01B 1/10
[52] U.S. Cl. ............................................. 172/371; 7/114
[58] Field of Search .......................... 172/19, 371, 377, 172/378, 376, 375; 7/114, 116

[56] References Cited

U.S. PATENT DOCUMENTS

| | | |
|---|---|---|
| 386,197 | 7/1888 | Hain . |
| 568,143 | 9/1896 | Parcells . |
| 1,282,930 | 10/1918 | Pike .......................................... 172/371 |
| 2,615,246 | 10/1952 | Littig . |
| 3,915,240 | 10/1975 | Pittman .................................. 172/371 |
| 4,077,479 | 3/1978 | Tibbs ...................................... 172/730 |
| 4,164,984 | 8/1979 | Palmer .................................... 172/371 |
| 4,886,125 | 12/1989 | Reilly ...................................... 172/371 |
| 5,350,021 | 9/1994 | Walker ................................ 172/377 X |
| 5,372,205 | 12/1994 | Velez ...................................... 172/371 |
| 5,390,746 | 2/1995 | Page ....................................... 172/371 |
| 5,479,993 | 1/1996 | Bojar ...................................... 172/372 |
| 5,529,129 | 6/1996 | Byrd ....................................... 172/377 |
| 5,716,132 | 2/1998 | Chou .................................. 172/371 X |
| 5,743,340 | 4/1998 | Giacomini .............................. 172/371 |
| 5,765,647 | 6/1998 | Hood ...................................... 172/371 |
| 5,791,708 | 8/1998 | Capriotti ............................ 172/377 X |
| 5,816,338 | 10/1998 | Fleming .............................. 172/371 X |
| 5,819,856 | 10/1998 | Meyer .................................. 172/371 X |
| 6,044,914 | 4/2000 | Johnson .................................. 172/377 |

*Primary Examiner*—Christopher J. Novosad
*Attorney, Agent, or Firm*—Westman, Champlin & Kelley, P.A.

[57] ABSTRACT

A dual blade garden hoe includes a head and a handle. The head has a longitudinal base to which two blades are mounted, the blades have cutting edges and being mounted so that the cutting edges are distal from the base. The base orients the blades so that when the cutting edges of the blades are in contact with a working surface, each blade extends upwardly from the working surface at an acute angle. The handle is mounted to the base and oriented at an acute angle to the working surface when the cutting edges are in contact with the working surface.

20 Claims, 2 Drawing Sheets

DUAL BLADE HOE

CROSS-REFERENCE TO RELATED APPLICATION(S)

This application claims priority of Provisional Application No. 60/096,201 filed Aug. 12, 1998 for "DUAL BLADE HOE" by James H. Johnson.

BACKGROUND OF THE INVENTION

This invention relates generally to the field of garden tools, and particularly to a dual blade hoe for weeding and cultivating.

While gardening implements have become more technologically advanced, there is still a need for manual gardening devices. The common garden hoe is still one of the most widely used manual gardening devices. Garden hoes generally fall into two categories, one being the common garden hoe that chops weeds and soil, and the other being a shuffle or scuffle hoe that works the surface of the soil and cuts weed roots below the surface. The garden hoe, however, permits work being accomplished at a rather slow rate of speed. Thus, shuffle or scuffle hoes employ a single blade to work the soil in a single direction, requiring movement around the plants by the user to operate the hoe in various directions.

The present invention is directed to a garden hoe of the shuffle or scuffle variety that employs at least two rigid blades that may be operated in a push/pull manner by the user to cultivate and weed in two directions.

BRIEF SUMMARY OF THE INVENTION

The present invention is directed to a dual blade hoe for use in gardening that employs at least two rigid blades, a connecting base, and a handle. The base connects to the blades at their approximate mid-point so that the cutting edges are at opposite angles to the working surface.

In one form of the invention a dual blade garden hoe includes a head and a handle. The head has first and second planar blades each having a cutting edge along its length. A longitudinal base has first and second ends to which the blades are fixedly mounted so that the lengths of the blades are normal to the length of the base and the cutting edges of the blades ace distal to the base. The base orients the blades at acute angles to the working surface. The handle is mounted to the base and oriented at another acute angle to the working surface when the cutting edges are in contact with the working surface.

In a preferred embodiment the cutting edges are generally straight and extend along the entire length of the respective blade, which may be substantially equal. In the preferred embodiment the acute angle between the working surface and the first and second blades is about 15°.

In preferred embodiments the acute angle between the working surface and the handle is between about 35° and 45°. In one embodiment the angle is about 35° and the handle is short permitting use by a sitting, kneeling or stooping user, whereas in another embodiment the angle is about 45° and the handle is long permitting use by a standing user.

DETAILED DESCRIPTION

Figure 1:
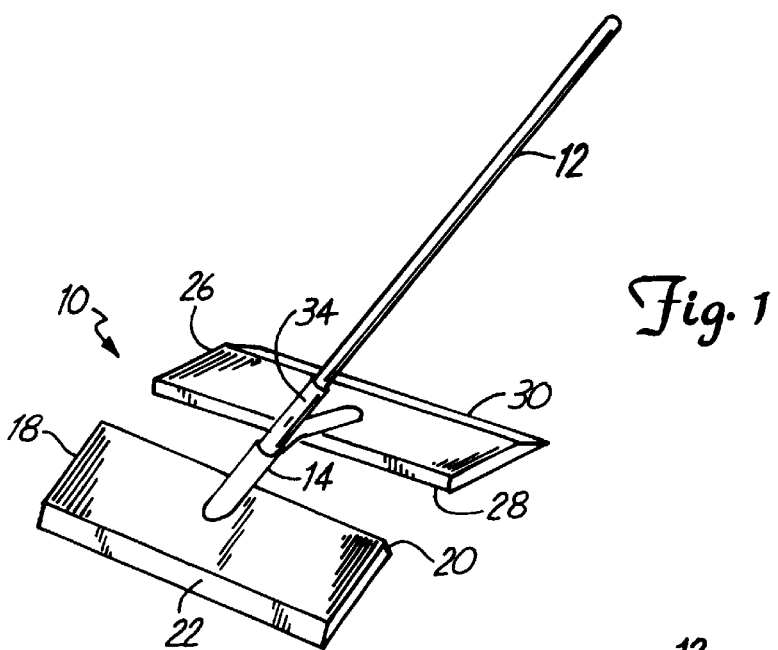
FIG. 1 is a perspective view of a garden hoe in accordance with the presently preferred embodiment of the present invention.

The garden hoe according to the present invention comprises a head 10 mounted to a handle 12. The head includes a longitudinal base 14 having a first end surface 16 to which a first blade 18 is attached. In preferred embodiments, blade 18 is attached to surface 16 at a central location along the length of the blade, adjacent an edge 20. The opposite edge 22 is a cutting edge, sharpened to loosen soil and cut weeds when in use.

The opposite end of base 14 include, a surface 24 to which a second blade 26 is attached at a central location thereof adjacent edge 28. Blade 26 includes a sharpened cutting edge 30 opposite edge 28.

Surfaces 16 and 24 of base 14 orient blades 18 and 26 at an acute angle $\phi$ to the soil or working surface 32. In preferred embodiments, acute angle $\phi$ is approximately 15°. Thus, when situated on the working surface, the cutting edges engage the working surface 32 and blades 18 and 26 are oppositely oriented upwardly from the working surface and toward base 14 at an angle of about 15°.

Figure 2:
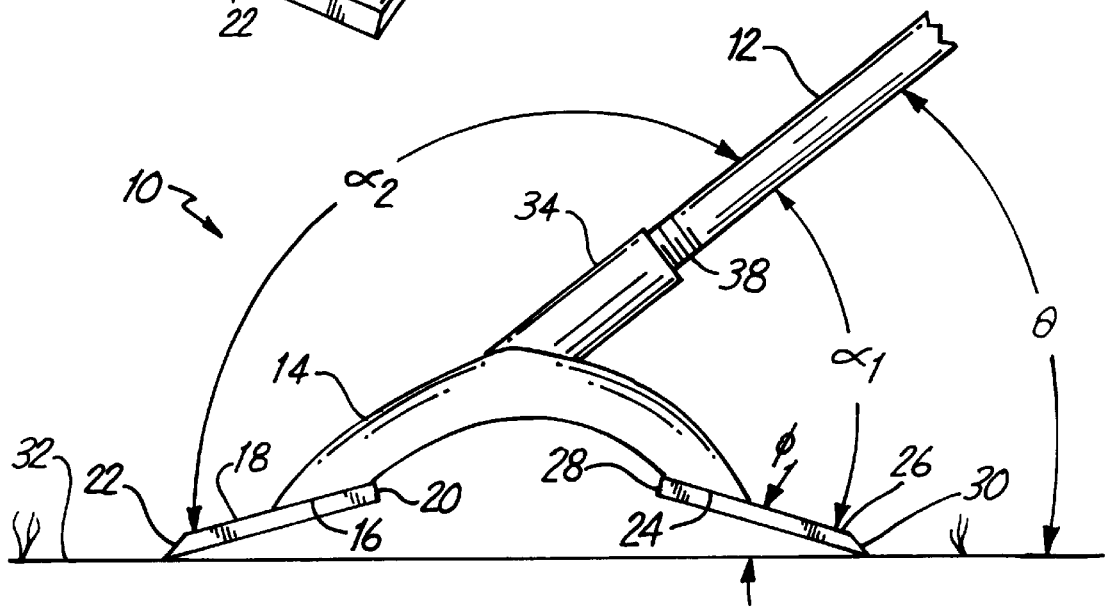
FIG. 2 is a side view of the garden hoe.

Base 14 includes a mounting member 34 to which handle 12 may be attached. For example, mounting member 34 may include a threaded aperture 36 (FIG. 3) to which a threaded portion 38 (FIG. 2) of handle 12 may be removably fastened. It is preferred that handle 12 be removably attached to base 14 so that different sized handles 12 may be fastened to the head for different users and different uses.

Figure 3:
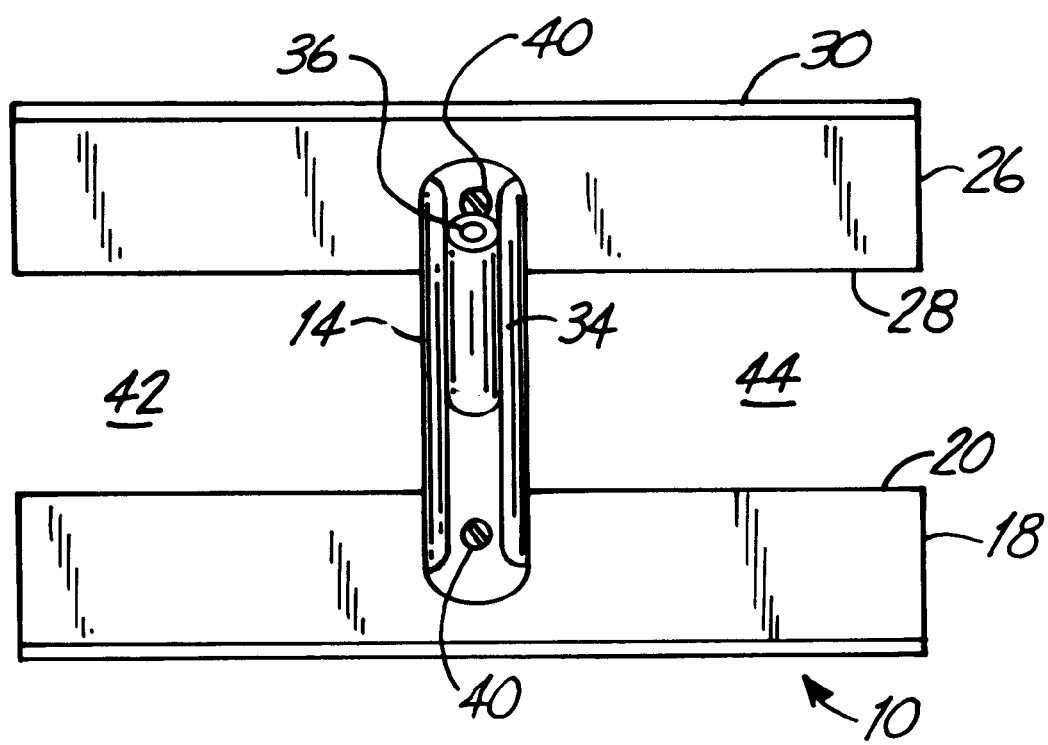
FIG. 3 is a top view of the head of the garden hoe.

Base 14 is preferably constructed of rigid material, such as cast steel or aluminum, and blades 18 and 26, which are preferably formed of hardened steel, are attached to base 14 by suitable mechanisms such as by welding, or threaded fasteners 40 (FIG. 3). Mounting plates and the like may also be employed for blade orientation purposes. The particular mechanism for mounting blades 18 and 26 to the base is not important to the present invention, provided that the blades are rigidly mounted to the base and oriented as described and the mounting mechanism does not interfere with the use of the device. Similarly, the nature of mounting member 34 for mounting handle 12 to the base is not important to the invention provided that a mechanism is provided to permit the user to grasp the handle and use the hoe.

Handle 12 is oriented with the respective base 14 so that angle $\theta$ between handle 12 and the working surface 32 is approximately 35° to 45°, depending upon the use and user. For example, a small version of the hoe, where the user sits, stoops or kneels, employs a short handle 12 and a smaller angle $\theta$ (about 35°) whereas a larger version of the hoe, where the user is standing when in use, angle $\theta$ is preferably about 45°.

In one form of the invention, each blade 18 and 26 has a size of approximately 6½ inches in length and a width of approximately 1¼ inches between edges 20 and 22 and edges 28 and 30, respectively. In this form of the invention, base 14 maintains a separation between edges 20 and 28 of blades 18 and 26 of about 1½ inches. Handle 12 is oriented at about 45° to the working surface and is long enough to permit the user to stand while using the hoe. In this form of the invention, the angle $\alpha_1$ between handle 12 and blade 26 equals $\theta+\phi$ and is 60° and the angle $\alpha_2$ between handle 12 and blade 18 equals $180°-\theta+\phi$ and is 150°.

A smaller version of the hoe is constructed so that blades 18 and 26 have a length of approximately 3¼ inches and a width of approximately ¾ of an inch with a separation by base 14 of approximately 1 inch. In this version of the hoe, a shorter handle 12 is employed and is oriented at an angle θ of approximately 35° from the working surface by mount 34 so that angle $\alpha_1$ is 50° and the angle $\alpha_2$ is 160°. In this version, the user might sit, kneel or stoop to cultivate plants in the manner described in connection with a larger unit.

The dual blade hoe provides greater efficiency in both destroying weeds and loosening and cultivating the soil. The cutting edges on both the back and front of the dual blade hoe permit work to be accomplished in a push and pull or shuffle motion, increasing the speed and efficiency of the work. Branches of low branched and bushy and vining plants are pushed out of the way by the upwardly inclining blades so that the bushes and vines are lifted upwardly, out of the way of damage by the blades themselves. The depth of cut of the hoe is limited by the trailing blade 26, and may be adjusted by the user by simply lifting or lowering the handle end to tilt the hoe and adjust the angle of the blade to the soil surface for greater or lesser depth of cut. Thus, the angle of the forward blade 18 to the soil surface equals θ–φ. In one embodiment, φ is 15° so if the handle is moved between about 35° and 55° to the surface, the angle of blade 18 to the surface changes between about 20° and 40°.

The hoe may also be used in an inverted position so that blade 18 is at a greater angle to the surface 32 of the soil. In this position, the angle of blade 18 to the surface equals 180° minus $\alpha_2$ plus the angle between the handle and the surface of the soil. In one embodiment $\alpha_2$ is 150°, so that where the handle is oriented 45° from the soil surface, blade 18 will be at an angle of 75° to the surface. Changing the handle orientation between 35° and 55° will change the angle between blade 18 and the surface between 65° and 85°. In this inverted position, blade 18 is used for chopping the soil to cultivate close to desired plants. Blade 26 is, of course, raised well above the soil to hold back the foliage of the plant.

Although the present invention has been described with reference to preferred embodiments, workers skilled in the art will recognize that changes may be made in form and detail without departing from the spirit and scope of the invention.

What is claimed is:

1. A dual blade garden shuffle or scuffle hoe comprising:
   a head, the head having
   a first generally planar blade having a length and a cutting edge along the length;
   a second generally planar blade having a length and a cutting edge along the length, and
   a longitudinal base having a length defining first and second opposite ends having a space therebetween, the first blade being fixedly mounted to the first end and the second blade being fixedly mounted to the second end so that the lengths of the first and second blades are normal to the length of the base and the cutting edges of the first and second blades are distal to the base, the base orienting each blade at a first acute angle to a flat working surface so that the cutting edges are in contact with the working surface at the first acute angle; and
   a handle mounted to the base and oriented at a second acute angle to the working surface when the cutting edges are in contact with the working surface so that a push and pull or shuffle motion applied to the handle causes the blades to cultivate the working surface and cut weeds below the working surface.

2. The hoe of claim 1, wherein the cutting edges of the first and second blades are generally straight and extend along the entire length of the respective blade.

3. The hoe of claim 1, wherein the lengths of the first and second blades are substantially equal.

4. The hoe of claim 1, wherein the first acute angle is 15°.

5. The hoe of claim 4, wherein the cutting edges of the first and second blades are generally straight and extend along the entire length of the respective blade.

6. The hoe of claim 4, wherein the lengths of the first and second blades are substantially equal.

7. The hoe of claim 4, wherein the second acute angle is between 35° and 45°.

8. The hoe of claim 1, wherein the handle is removably attached to the base.

9. The hoe of claim 8, wherein the second acute angle is between 35° and 45°.

10. The hoe of claim 1 wherein an angle between the handle and the first blade is between 50° and 60° and an angle between the handle and the second blade is between 160° and 150°.

11. A dual blade garden hoe of the shuffle or scuffle variety comprising:
    a head, the head having
    a longitudinal base having first and second ends having a space therebetween,
    a first generally planar blade fixedly mounted to the first end of the base, the first blade having a length extending normal to a length of the base and having a cutting edge along the length of the first blade distal from the base, and
    a second generally planar blade fixedly mounted to the second end of the base opposite the first end, the second blade having a length extending normal to the length of the base and having a cutting edge along the length of the second blade distal from the base,
    the base orienting the first and second blades so that when the cutting edges of the blades are in contact with a flat working surface, each blade extends upwardly from the working surface at a first acute angle; and
    a handle mounted to the base and oriented at a second acute angle to the working surface when the cutting edges are in contact with the working surface so that a push and pull or shuffle motion applied to the handle causes the blades to cultivate the working surface and cut weeds below the working surface.

12. The hoe of claim 11, wherein the cutting edges of the first and second blades are generally straight and extend along the entire length of the respective blade.

13. The hoe of claim 11, wherein the lengths of the first and second blades are substantially equal.

14. The hoe of claim 11, wherein the first acute angle is 15°.

15. The hoe of claim 14, wherein the cutting edges of the first and second blades are generally straight and extend along the entire length of the respective blade.

16. The hoe of claim 14, wherein the lengths of the first and second blades are substantially equal.

17. The hoe of claim 14, wherein the second acute angle is between 35° and 45°.

18. The hoe of claim 11, wherein the handle is removably attached to the base.

19. The hoe of claim 18, wherein the acute angle between the working surface and the handle is between 35° and 45°.

20. The hoe of claim 11, wherein an angle between the handle and the first blade is between 50° and 60° and an angle between the handle and the second blade is between 160° and 150°.

* * * * *